Aug. 20, 1968  N. BREWER  3,398,305
FLOWMETERS HAVING MAGNETIC FOLLOWERS
Filed Oct. 28, 1964  2 Sheets-Sheet 1

INVENTOR.
NATHANIEL BREWER
BY
ATTORNEYS

United States Patent Office 3,398,305
Patented Aug. 20, 1968

3,398,305
FLOWMETERS HAVING MAGNETIC FOLLOWER
Nathaniel Brewer, Newtown, Pa., assignor to Fischer & Porter Company, Warminster, Pa., a corporation of Pennsylvania
Filed Oct. 28, 1964, Ser. No. 407,107
4 Claims. (Cl. 310—104)

ABSTRACT OF THE DISCLOSURE

A variable area flowmeter, in which a float carrying a magnet is positioned in a flow tube according to the rate of flow of fluid in the tube, is provided with a magnetic follower element consisting of an elongated wire spaced from, and rotatable about an axis having a skew relationship with the axis of the flow tube. The elongated wire lies approximately in a common plane with its axis of rotation, but the wire is made from a readily permanently deformable material so that adjustments for linearity can be made by bending. A coupler transmits the motion of the follower to an indicator rotating about an axis parallel to the axis of the flow tube.

---

This invention relates to flowmeters and has particular reference to flowmeters of the variable area type in which a member (a float) occupies definite positions as a function of flow. The invention is concerned with the matter of securing outputs by magnetic couplings to the float.

It has been proposed, as disclosed in the application of Ollivier and Skitt, Ser. No. 82,984, filed January 16, 1961, now Patent 3,213,686, to provide for indicating or signal transmitting purposes a magnetic follower positioned by a magnet carried by the float, the magnetic follower taking the form of a helical wire or tube supported by a shaft having its axis parallel to that of the flowmeter tube. If, as is usually desired, the movement of the shaft should be linear with flow, for example so that a needle carried thereby may cooperate with a linear scale, it would usually be necessary that the magnetic helix should not be of an equiangular type, i.e., having an angular advance about the shaft axis proportional to distance therealong. The reason for this is because axial position of the float is usually not accurately linear with flow rate. In accordance with said application, therefore, the follower was made of a high permeability iron and desirably in the form of a hollow tube of small diameter, the tube having the property of being readily permanently deformable, so that, though originally placed in the apparatus to approximate an equiangular helix, it could be readily and permanently deformed during calibration of the flowmeter not only by change of helix angle but by introduction of such departures from an equiangular helix as would produce an overall indication or response linear with flow.

While such adjustments may be made, they are somewhat tedious. The adjustments, in general, involve slight changes from what might be considered a theoretical helix, and accordingly the starting point for the adjustment should be a fairly good approximation to the theoretical helix. But considering that the magnetic follower member is a wire or tube supported only at its ends, the achievement of a good initial helix is somewhat difficult because of the fact that a helix is not easily measurable in space. Attempts to mount the helix on a cylinder essentially defeat the possibility of final calibrating adjustment.

In accordance with the present invention, an arrangement is provided which facilitates the making of the fine adjustment to secure linearity of response. In brief, a magnetic follower element in the form of a wire or tube of the type already indicated is mounted on a shaft the axis of which is not parallel with the axis of the flow tube but, rather, has an angular skew relationship with respect thereto. If, then, the elongated follower element is originally set to lie in an axial plane with respect to the axis of its supporting shaft, there is obtained an arrangement which is a quite close first approximation to one which will give a linear response with respect to flow, on the assumption, which is fairly good, that the position of the float is also reasonably linear with respect to flow. The initial arrangement of the follower parallel to its axis of rotation is readily achieved; and the relatively slight adjustments required to secure linearity of response become quite simple.

When this arrangement is adopted, however, it is not desirable to have the angular rotation of the supporting shaft directly indicated by a pointer secured to the shaft and moving relatively to a fixed scale, in that, since for proper operation the flow tube must be essentially vertical, the scale would then extend at an angle to the horizontal giving rise to a rather non-conventional appearance. It is desirable, therefore, to add a coupling arrangement for driving a pointer relatively to a horizontal scale provided on a cylindrical surface having a vertical axis. This, however, is merely for visual observation. If pneumatic or electrical transmission is desired, suitable cam elements may be provided directly on the shaft mounting the follower.

The general objects of the invention relate to the achievement of the foregoing desired results and these and others relating to details of construction will become more apparent from the following description when read in conjunction with the accompanying drawings, in which.

Figure 3:
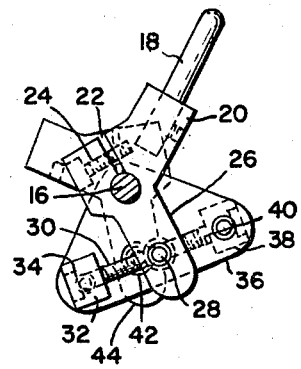
FIGURE 3 is a fragmentary transverse section taken on the plane indicated at 3—3 in FIGURE 1.
Figure 4:
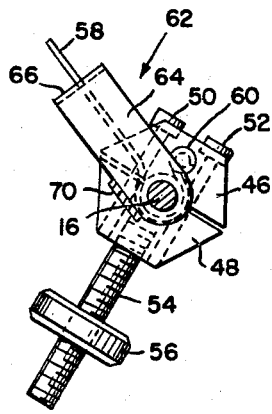
FIGURE 4 is a fragmentary section taken on the plane indicated at 4—4 in FIGURE 1.
Figure 1:
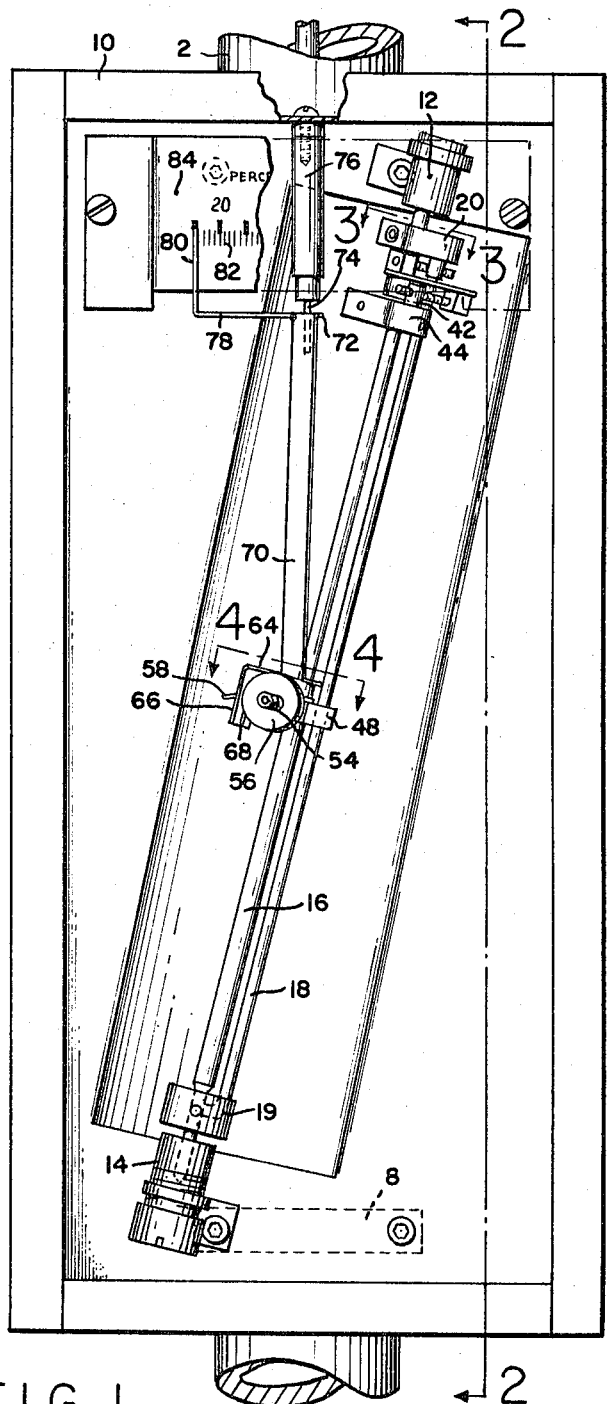
FIGURE 1 is a front elevation, with certain parts broken away, and with the front cover removed, of a follower and indicator assembly provided in accordance with the invention and associated with a variable area flowmeter tube.
Figure 2:
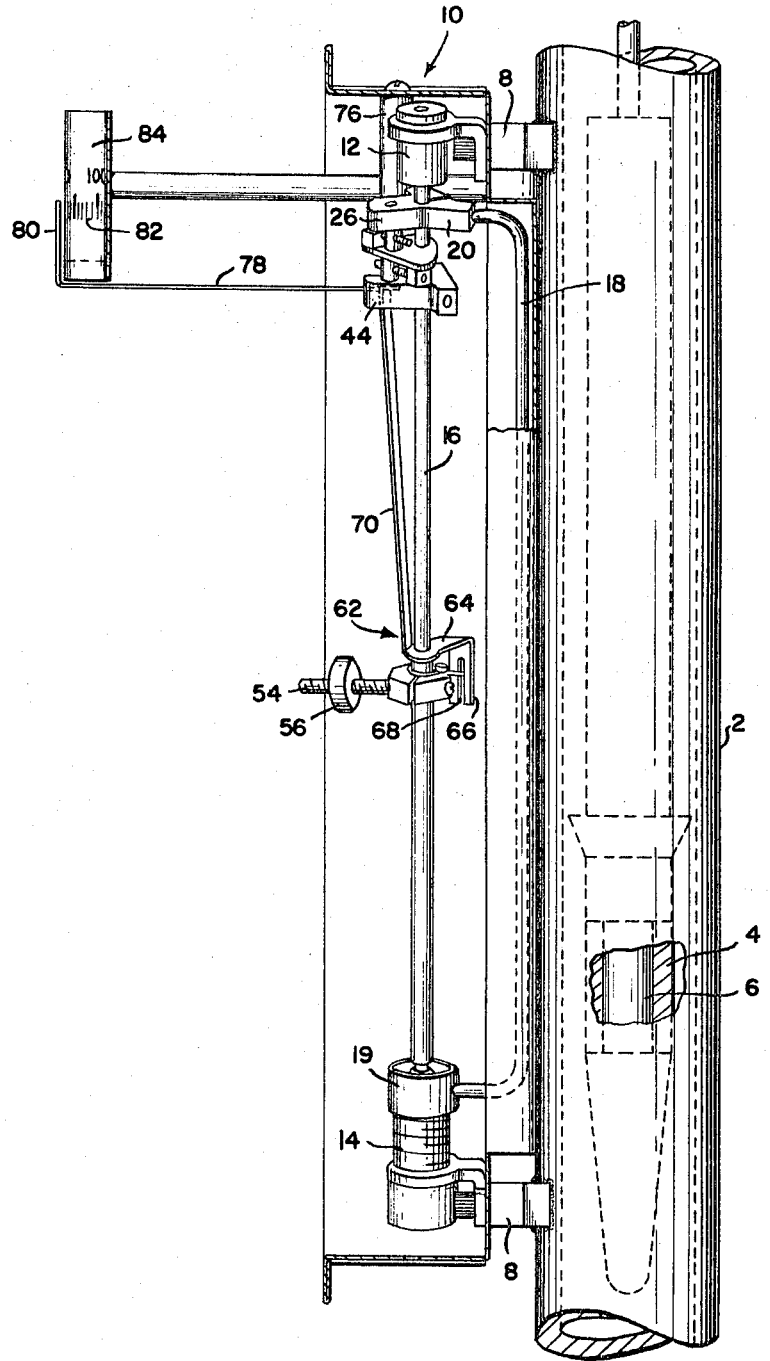
FIGURE 2 is a vertical section taken on the plane indicated at 2—2 in FIGURE 1.

A variable area flowmeter tube of conventional type is indicated at 2. Within this there moves the float shown at 4 which may be of conventional shape such as commonly used for securing relative insensity to viscosity changes, the float being related to the flow tube to secure approximate linearity of vertical position with respect to flow rate. The float may be associated with conventional guiding means to maintain approximately central its relationship to the tube. A permanent magnet 6 is provided in the float in the form of a cylinder having its magnetic axis coincident with the axis of the float, for example having its upper end north and its lower end south. The tube 2 may be of any desired non-magnetic material suitable for the liquids to be metered. What has been so far described is the conventional arrangement used for transmission of indication through a helical follower of magnetic material which, mounted on an axis parallel to the flow tube, takes a position which for any vertical location of the float results in the establishment of a minimum reluctance path for the magnetic circuit originating with the permanent magnet.

In accordance with the present invention, the follower for the magnet is differently arranged. If the flow tube is metallic, brackets 8 may be secured thereto to carry a frame 10 the details of which are quite arbitrary. If a glass tube is used, the frame may be clamped thereto by suitable clamping arrangements. The frame is provided with upper and lower bearings 12 and 14, respectively, providing low friction mountings for the ends of a shaft or spindle 16. The follower member 18 has a substantially straight portion and laterally turned ends secured in support members 19 and 20 secured to the spindle 16. The former of these is a collar secured fixedly to the spindle. The latter, 20, is adjustable about the spindle as will be shortly described. The follower 18 is most desirably in the form of a small diameter tube of a high permeability iron and may be considered to be initially straight between its ends and parallel to the axis of the spindle. While the follower may be of solid wire, it has been found advantageous to use a small diameter tube since when such a tube is slightly deformed it will retain the shape given to it having relatively little elasticity, even slight deformation involving exceeding its elastic limit. It may be most aptly described as permanently deformable.

At this time the general functioning may be indicated. Assuming that the follower is parallel to the spindle axis and, as illustrated, that it approaches closely the exterior surface of the flow tube 2, which surface is usually and conventionally cylindrical, it will be evident that as the float moves vertically the follower will rotate the spindle 16 to positions in each of which the follower 18 is so located and to produce a minimum reluctance path for the magnetic circuit established by the permanent magnet 6. This arrangement will then give rise to an angular movement of the spindle which is fairly closely linear with respect to the vertical location of the float. If the follower is straight, as assumed, it will be evident that when the float is in the mid portion of its range of travel the follower will be somewhat closer to it than when the float is at the end portions of its travel; but if the skew angle of the spindle is small with respect to the axis of the flow tube along which the float travels, as illustrated in the drawings, this difference in spacing is quite immaterial, particularly considering the fact that from a practical standpoint the magnet 6 is at all times substantially spaced from the follower. Theoretically, uniform spacing could be achieved if the follower, though in an axial plane, was shaped approximately as a hyperbola having the spindle axis as its mathematical axis, but this has been found quite unnecessary since the slight non-linear aspects resulting from the straight line condition of the follower are minor as compared with the adjustments, though slight, usually necessary to tailor the follower arrangement to the flowmeter to secure linearity with respect to flow rate.

In order to facilitate adjustments, the mounting member 20 for the upper end of the follower 18 is in the form of a clamp having a split 22 which is contractable by a screw 24 to secure it tightly to the spindle when adjustments are finally made or to provide for freedom of movement, with friction, during adjustment. The member 20 has an arm 26 in which there is pivoted a block 28 threaded to receive a screw 30 journalled in a block 32 which receives its head 34. The block 32 is pivotally mounted in a member 36 which is free to rotate about the spindle. This member 36 carries pivotally another block 38 extending downwardly therefrom and having a socket for the head of another adjusting screw 40 which is threaded into a block 42 pivotally mounted in a lower clamp 44 which is fixedly secured to the spindle. It will be evident that this arrangement permits fine adjustment of the follower 18 about the spindle axis by freeing up of the screws followed by tightening them.

Residual minor adjustments may be made by bending the follower 18 as may be required. In this bending the permanent distortability is utilized.

If the spindle carried a pointer, it is evident that for proper cooperation with a scale the scale would have to be tilted relative to the horizontal at the angle of tilt of the spindle relative to the vertical. Accordingly, at approximately the mid point of the spindle a clamp is provided in two parts 46 and 48 secured on the spindle by clamping screws 50 and 52. This clamp also provides a convenient mounting for a balancing arrangement involving the screw 54 secured therein on which a counter weight 56 is threaded to provide a balanced system. An arm in the form of a wire 58 secured to the clamp at 60 extends radially. A sheet metal member 64 has a loose mounting on the spindle 16 and is provided with a downturned portion 66 provided with a slot 68 through which the wire arm 58 extends. The member 64 also has a ribbon-like, effectively rigid, vertical extension 70 which has a turned upper end 72 provided with an opening receiving the vertically extending pin 74 mounted in a post 76 secured in the frame. The end 72 carried the pointer 78 which has an upturned end 80 moving adjacent to a scale 82 on the cylindrical surface of a member 84. The ribbon 70 is mounted effectively for rotation about a vertical axis established by the pin 74 and the loose mounting of the member 64 on the shaft 16. This results despite the fact that the spindle 16 is sloping with respect to the vertical. While the result of this arrangement is slight non-linearity as between the angular movements of the pointer 78 and the spindle 16, this slight deviation may also be corrected by the adjustment of the follower 18 as previously described.

It will be evident that the connection between the spindle and a member corresponding to 70 may be made in other fashions as for example by a link, bevelled gearing, and the like.

If pneumatic or electrical transmission of signals is desired, the elements for this purpose (in the form of cams) may be secured either to the spindle 16 or to the member 70. The Ollivier and Skitt application referred to above indicates a suitable arrangement which may be utilized for pneumatic transmission. For electrical transmission there may be utilized the system described in the application of Ollivier, Skitt, Schmoock and Shaffer, Ser. No. 136,933, filed Sept. 8, 1961.

It will be evident that various details may be modified without departing from the invention as defined in the following claims.

What is claimed is:

1. In combination, means providing a magnet guided for movement along a predetermined substantially straight line path and positionable along said path in accordance with the value of a variable, a follower for said magnet, and means mounting said follower for rotation about an axis having a skew relationship to said path, said follower comprising an elongated wire-like magnetic element of readily permanently distortable material, said mounting means supporting said magnetic element with the major portions of said magnetic element free of and movable relatively to said mounting means to permit such permanent distortion and effecting presentation of successive portions of said major portions of the elongated magnetic element to the magnet at approximately the same distance therefrom as the magnet moves, said major portions of the elongated magnetic element being approximately in an axial plane through said axis.

2. In combination, means providing a magnet guided for movement along a predetermined substantially straight line path and positionable along said path in accordance with the value of a variable, a follower for said magnet, and means mounting said follower for rotation about an axis having a skew relationship to said path, said follower comprising an elongated wire-like magnetic element of readily permanently distortable material, said mounting means supporting said magnetic element with the major portions of said magnetic element free of and movable relatively to said mounting means to permit such permanent distortion and effecting presentation of successive portions of said major portions of the elongated magnetic element to the magnet at approximately the same distance therefrom as the magnet moves, said major portions of the elongated magnetic element being approximately straight and parallel to said axis.

3. In combination, means providing a magnet guided for movement along a predetermined substantially straight line path and positionable along said path in accordance with the value of a variable, a follower for said magnet, means mounting said follower for rotation about an axis having a skew relationship to said path, said follower comprising an elongated wire-like magnetic element of readily permanently distortable material, said mounting means supporting said magnetic element with the major portions of said magnetic element free of and movable relatively to said mounting means to permit such permanent distortion and effecting presentation of successive portions of said major portions of the elongated magnetic element to the magnet at approximately the same distance therefrom as the magnet moves, said major portions of the elongated magnetic element being approximately in an axial plane through said axis, a member mounted for rotation about a second axis parallel to the path of movement of the magnet, and means coupling the follower to said member to impart movements to said member about its axis as the follower rotates.

4. In combination, means providing a magnet guided for movement along a predetermined substantially straight line path and positionable along said path in accordance with the value of a variable, a follower for said magnet, means mounting said follower for rotation about an axis having a skew relationship to said path, said follower comprising an elongated wire-like magnetic element of readily permanently distortable material, said mounting means supporting said magnetic element with the major portions of said magnetic element free of and movable relatively to said mounting means to permit such permanent distortion and effecting presentation of successive portions of said major portions of the elongated magnetic element to the magnet at approximately the same distance therefrom as the magnet moves, said major portions of the elongated magnetic element being approximately straight and parallel to said axis, a member mounted for rotation about a second axis parallel to the path of movement of the magnet, and means coupling the follower to said member to impart movements to said member about its axis as the follower rotates.

References Cited
UNITED STATES PATENTS

| | | | |
|---|---|---|---|
| 3,232,109 | 2/1966 | Harris | 73—209 |
| 3,260,110 | 7/1966 | Lutz | 73—209 |

ROBERT K. SCHAEFER, *Primary Examiner.*

H. O. JONES, *Assistant Examiner.*